Dec. 12, 1944.  R. M. HARDGROVE  2,364,633
DISTRIBUTOR
Filed March 23, 1942  6 Sheets-Sheet 1

INVENTOR.
Ralph M. Hardgrove
BY

ATTORNEY

Dec. 12, 1944.    R. M. HARDGROVE    2,364,633
DISTRIBUTOR
Filed March 23, 1942    6 Sheets-Sheet 2

INVENTOR.
Ralph M. Hardgrove
BY
ATTORNEY

Dec. 12, 1944.   R. M. HARDGROVE   2,364,633
DISTRIBUTOR
Filed March 23, 1942   6 Sheets-Sheet 3

INVENTOR.
Ralph M. Hardgrove
BY
ATTORNEY

Dec. 12, 1944.  R. M. HARDGROVE  2,364,633
DISTRIBUTOR
Filed March 23, 1942  6 Sheets-Sheet 4

INVENTOR.
Ralph M. Hardgrove
BY
ATTORNEY

Dec. 12, 1944.                R. M. HARDGROVE                2,364,633
                                  DISTRIBUTOR
                              Filed March 23, 1942            6 Sheets-Sheet 5

INVENTOR.
Ralph M. Hardgrove
BY
ATTORNEY

Dec. 12, 1944.   R. M. HARDGROVE   2,364,633
DISTRIBUTOR
Filed March 23, 1942   6 Sheets-Sheet 6

INVENTOR.
Ralph M. Hardgrove
BY
ATTORNEY

Patented Dec. 12, 1944

2,364,633

UNITED STATES PATENT OFFICE 2,364,633

DISTRIBUTOR

Ralph M. Hardgrove, Westfield, N. J., assignor to The Babcock & Wilcox Company, Newark, N. J., a corporation of New Jersey Application March 23, 1942, Serial No. 435,760

13 Claims. (Cl. 302—28)

The invention disclosed herein relates to the transportation of finely divided solids suspended in a gas such as air, including the distribution of such gas-borne particles to various points of use.

An application of this invention is found in the transportation and distribution of a pulverulent material such as pulverized coal wherein it is desired to divide a main fluent stream of the fuel proportionately for delivery to a plurality of burners. There are occasions when the distribution of solids in the main supply stream is not uniform throughout its cross-section, resulting from the form and/or arrangement of the conducting piping, or from other conditions, so that when such a stream is divided, the quantity of fuel or other finely divided material delivered through one outlet branch may differ appreciably from the quantity delivered through another outlet branch. Moreover, if the main stream were of uniform density throughout its cross-section, the density of the branch streams might not only be different, but the distribution less uniform in one stream than in another.

It is therefore a purpose of the invention to provide accurate division of a fluent stream of finely divided material and to provide improved distribution of the separate divisions through a plurality of outlets.

Since conduits of circular cross-section are best adapted to the conveyance of streams of airborne pulverized material, it is further proposed to provide dividing and distributing apparatus particularly adapted for use with such conduits.

Another object is to provide distribution of a stream of pulverized material suspended in gas whereby the desired proportionate flow is maintained from a single inlet to and through a plurality of outlets with minimum loss of pressure.

In the furtherance of these objects it is proposed to divide an inlet stream of fluent pulverized material of circular cross-section into a plurality of streams of sectoral cross-section in symmetrical arrangement, and to combine selected divisional streams into a smaller number of concentrically arranged outlet streams of circular periphery discharging through circular wall section conduit outlets.

An additional object is to provide a distributing device wherein an inlet stream of gas-suspended pulverized material is divided to provide a plurality of separate divisional streams, of equal cross-section and symmetrical arrangement at the zone of division, and wherein certain oppositely disposed divisional streams are reunited to provide a lesser number of outlet streams.

It is also proposed to provide flow distributing apparatus for a gaseous stream having pulverized material suspended therein, wherein the flow directing surfaces are so arranged as to prevent accumulation of pulverized material thereon when flow velocities within the apparatus are reduced below their normal operating values.

The foregoing objects and others, together with the advantages resulting from the use of this invention, are more fully set forth in the following description of selected embodiments as illustrated in the accompanying drawings, wherein.

Figure 1:
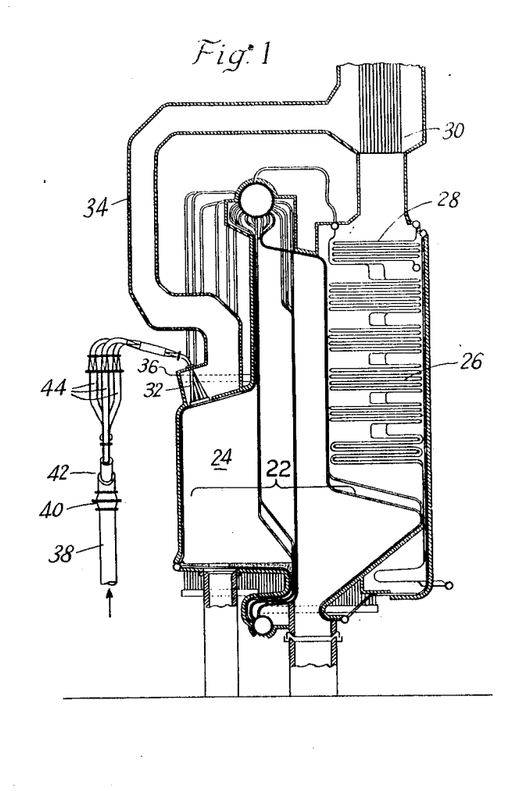
Figs. 1 and 2 illustrate the invention as applied to the pulverized fuel burner system of a boiler.
Figure 2:
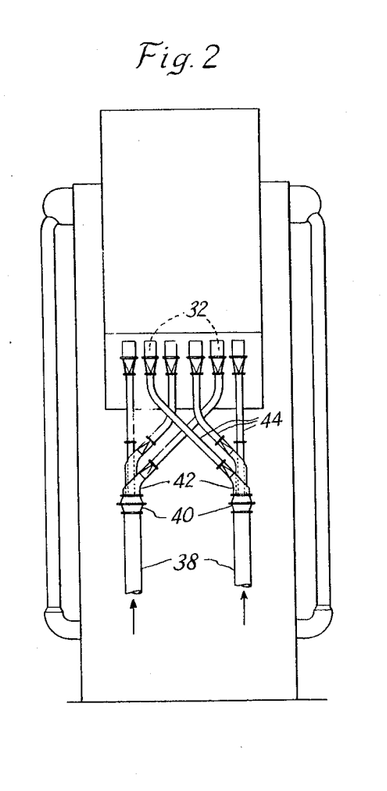

In detail, and referring particularly to Figs. 1 and 2, an embodiment of the invention is indicated in connection with a pulverized fuel fired boiler unit wherein a boiler section 22 comprises heating surface arranged within and beyond the furnace 24, followed by other heating surface in the superheater 26, economizer 28, and air heater 30 in the path of the outgoing heating gases. Burners 32 may be arranged in a horizontal row as indicated for discharging fuel into the furnace in a downward direction, hot secondary air for supporting combustion being supplied to the burners through one or more ducts 34 and windbox 36. The burners are of a type suitable for burning a pulverized fuel which is supplied in a fluent condition through a system of piping from one or more pulverizers (not shown), each main supply pipe 38 suitably leading from a single pulverizer and receiving a supply of finely divided coal suspended in a stream of gas such as air. Each such stream of fuel is then conducted to a distributor device 40, to be more specifically described, wherein the stream of fuel is divided to provide a plurality of branch streams, each constituting a predetermined proportionate division of the total fuel supply, the divisional streams from each distributor device 40 being suitably discharged through a branch outlet fitting 42 and directed through separate pipes 44 to individual burners 32.

Referring to Figs. 3–7, a form of distributor 46 is shown suitable for use in an arrangement such as in Figs. 1 and 2 except for a different number of burners, a main stream of fuel being divided into two separate streams instead of three. The distributor 46 includes a casing 48 of circular cross-section throughout, and is provided at one end with a circular inlet opening 50 and at the other end with concentric circular outlet openings 52 and 54, the opening 52 being centrally disposed within the annular opening 54. In the form shown, the outer diameter of the annular outlet 54 is substantially equal to the diameter of the inlet opening 50, thus making the total outlet area substantially equal to the inlet area; and, as further indicated, the area of one outlet opening 52 being substantially equal to the area of the other outlet opening 54. It will be understood, however, that such areas may be otherwise proportioned, as desired. The diameter of the casing 48 is enlarged at its midsection, as at 56, and may thus be formed of conical portions 58 and 60, circumferentially welded as indicated. A bolting flange 62 may be used for making connection with the supply pipe 38.

Plates 64, arranged radially of the casing 48 at its inlet end, divide the inlet opening 50 into a plurality of sectoral divisions 66, such plates extending longitudinally of the casing to form flow directing channels 68, and being generally trapezoidal in form are provided with edges 70 in or adjacent the plane of the inlet opening 50, and edges 72 in contact with the inclined inner wall of the casing section 58. Other edges 74 and 76 of each plate intersect in a corner 78 in a plane intermediate the inlet and outlet ends of the casing, the corners 78 of successive plates being spaced circumferentially on a circle coinciding with the larger inner end of the conical member 80 which extends to the outlet end of the casing 48 to form a dividing wall between the central and annular outlet openings 52 and 54.

Alternate channels 82 have their inner portions blocked off or closed along the edges 74 of plates 64, from the circumferential location of the corners 78 inwardly to the central axis, the closure means including a centrally disposed and generally conical filler piece 84 and members 86, the remaining group of alternately arranged channels 88 having their corresponding inner portions left open to provide a group of ports 90 leading to the conical space 92 adjacent the central outlet opening 52. Alternate channels 88 have their outer portions blocked off or closed along the edges 76 of plates 64 by means of closure members 94 extending from the circumferential location of the corners 78 outwardly to the casing 48 at its enlargement 56, the remaining group of alternately arranged channels 82 having their corresponding outer portions left open to provide a group of ports 96 leading to the annular outlet opening 54.

Each port 90 and each port 96 is preferably of the same area as the area of the corresponding sectoral division 66 of the inlet opening 50, so that the area provided for fuel flow through the distributor is maintained at least as great as the original entrance area, and since there are the same number of ports 90 as there are of ports 96, the total quantity of entering fuel is divided substantially equally between the equal-area outlet openings 52 and 54. This relation of areas is made possible by the enlargement of the casing at 56, and by suitable inclination of the edges 74 and 76 of the plates 64. A substantially constant area is also maintained throughout each of the channels 68 from the plane of the inlet opening 50 to the locations of the corresponding ports 90 and 96, and from the ports to the respective outlet openings 52 and 54, as determined by the inclinations and lengths of edges 74 and 76 relative to the angularity and dimensions of the conical casing sections 58 and 60.

Figures 3, 4, 5, 6, 7, 8:
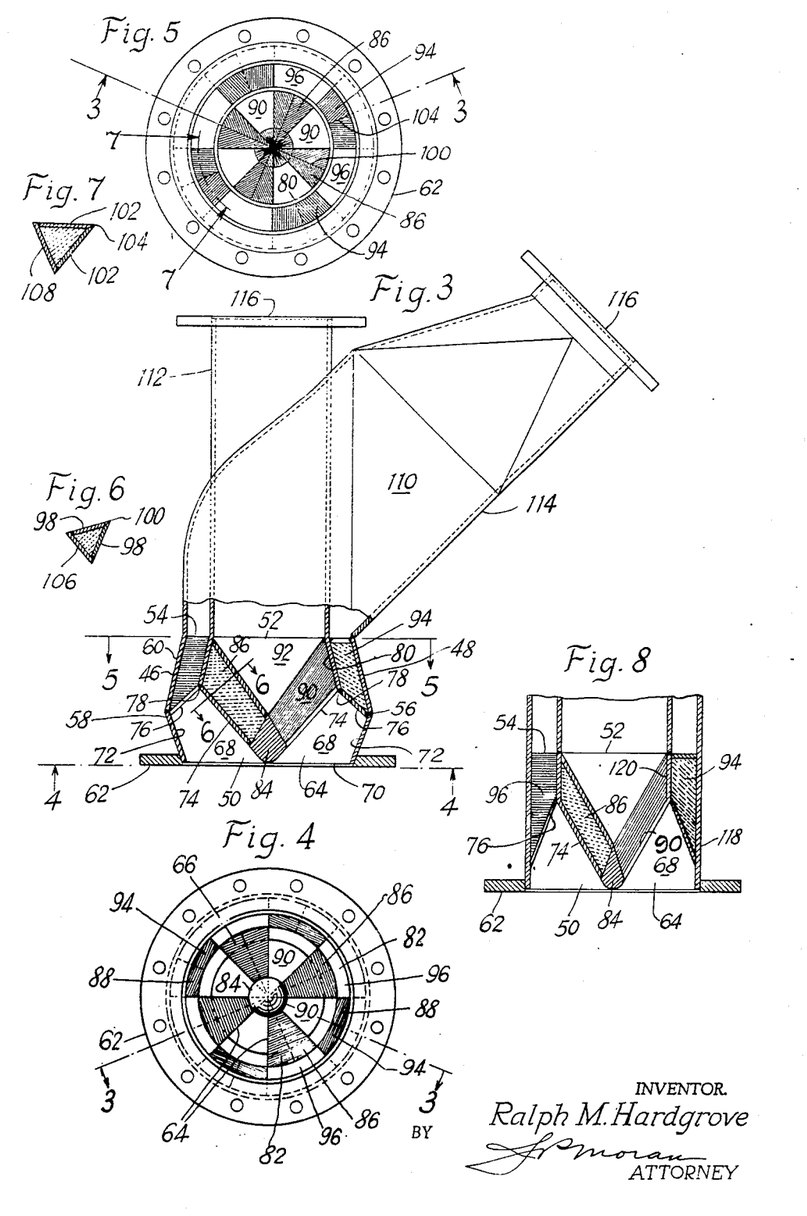
Fig. 3 is an elevational view partly in section showing a structure of the type generally indicated in Figs. 1 and 2.
Fig. 4 is an end projection in the plane of line 4—4 of Fig. 3.
Fig. 5 is a transverse section along line 5—5 of Fig. 3.
Fig. 6 is a transverse section along line 6—6 of Fig. 3.
Fig. 7 is a transverse section along line 7—7 of Fig. 5.
Fig. 8 is an elevational view similar to Fig. 3 showing a modification.

The closure members 86 are preferably formed as indicated in section in Fig. 6 with oppositely inclined surfaces 98 intersecting in a radial plane to form a peak or ridge 100 facing the central outlet opening 52, the line of the peak being inclined to the central axis to about the same degree as the inclined edges 74 of the plates 64. The closure members 94 are similarly formed as indicated in section in Fig. 7 with oppositely inclined surfaces 102 intersecting in a peak or ridge 104 facing the annular outlet opening 54, the line of the peak in this instance being substantially at right angles to the central axis. If desired, the closure members 86 and 94 may include bottom plates 106 and 108 respectively, to form tubes of triangular cross section, and in this form are termed crickets, the interiors of such crickets being preferably filled with a heat refractory material to prevent pocketing of fuel or a combustible mixture of fuel and air which might ignite.

The oppositely sloping surfaces 98 and 102 of the crickets 86 and 94 are effective in preventing any accumulation of fuel within the distributor as might be the case if the downstream surfaces of the closure members were horizontal or less steeply inclined. The inclination of such surfaces is accordingly greater than the angle of repose for the fuel being transported, the minimum degree of inclination being in the neighborhood of about 45°, a relative steep angle of inclination being of particular advantage when the distributor is used in a vertical position for upward flow as indicated. The peaked or converging formation of the downstream surfaces is also of benefit for any position of the distributor in eliminating eddies and in causing the streams from the spaced ports to be united without abrupt changes in flow velocity.

A branch outlet 110 is shown connected to the distributor 46 to provide a suitable conduit connection with separate outlet pipes 44, for example, leading to different burners as indicated in Figs. 1 and 2, one branch 112 receiving fuel from the central distributor outlet 52 and the other branch 114 receiving fuel from the annular distributor outlet 54, the branches diverging at an angle of about 45° and terminating in flanged outlet ends 116 of substantially equal flow areas. Branch 112 is conveniently made cylindrical of the same internal diameter as the central circular opening 52, thus maintaining a constant area throughout for constant velocity. Branch 114 initially of the greater diameter of the annular opening 54 and having a portion surrounding the branch 112 is suitably proportioned throughout its length to also maintain constant velocity.

Fig. 8 shows a modified form of distributor having a cylindrical outer casing 118 of single diameter throughout, and a concentrically arranged dividing wall 120 also of cylindrical form. Other parts of the structure are essentially as shown in Figs. 3-7, and are designated by corresponding reference numerals. The edges 74 and 76 of the plates 64 are more steeply inclined than in the arrangement shown in Fig. 3 so that a constant flow area may be maintained throughout the various passages, or at least reasonably approximated, without having to provide an intermediate enlargement of the outside casing 118. The crickets 86 and 94 are accordingly of steeper inclination than in Fig. 3 so that there would be little or no risk of fuel accumulations on downstream surfaces even if the pitched surfaces 98 and 102 were omitted and only the substantially flat bottom plates such as 106 and 108 were used. However, while such pitched surfaces may not be essential to prevent fuel accumulations, there still remains the advantage of improved flow conditions as previously mentioned.

In the modified arrangement, according to Figs. 9-12, there is a distribution of material from a single circular inlet 122 to three outlets, namely, a central circular outlet 124, an intermediate annular outlet 126, and an outer annular outlet 128. The outer casing 130 is formed with upper and lower conical sections 132 and 134 having companionate flanges 136 to provide a removable connection for inspection purposes, if desired. Other flanges 138 provide a suitable connection with the associated inlet and outlet piping in a system such as illustrated in Figs. 1 and 2. As in the previously described arrangements, radially arranged plates 140, similar to plates 64, divide the inlet area into a plurality of equal sectoral divisions, in this case, in three groups comprising four each of divisions 142, 144, and 146, respectively, such plates also defining the corresponding channels 148, 150 and 152 of the respective groups. The construction is otherwise generally similar to that already described except for such modifications as are due to the different number of outlets. The plates 140 are generally trapezoidal in form having edges 154 in or adjacent the plane of the inlet opening 122, edges 156 in contact with the inclined inner wall of the casing section 132, and other edges 158 and 160 intersecting in corners 162. A conical dividing wall 164 provides separation between the central outlet 124 and the intermediate outlet 126, as well as between passages leading to such outlets. A second conical dividing wall 166 provides separation between the annular outlets 126 and 128 as well as between passages leading to such outlets.

Figures 9, 10, 11, 12:
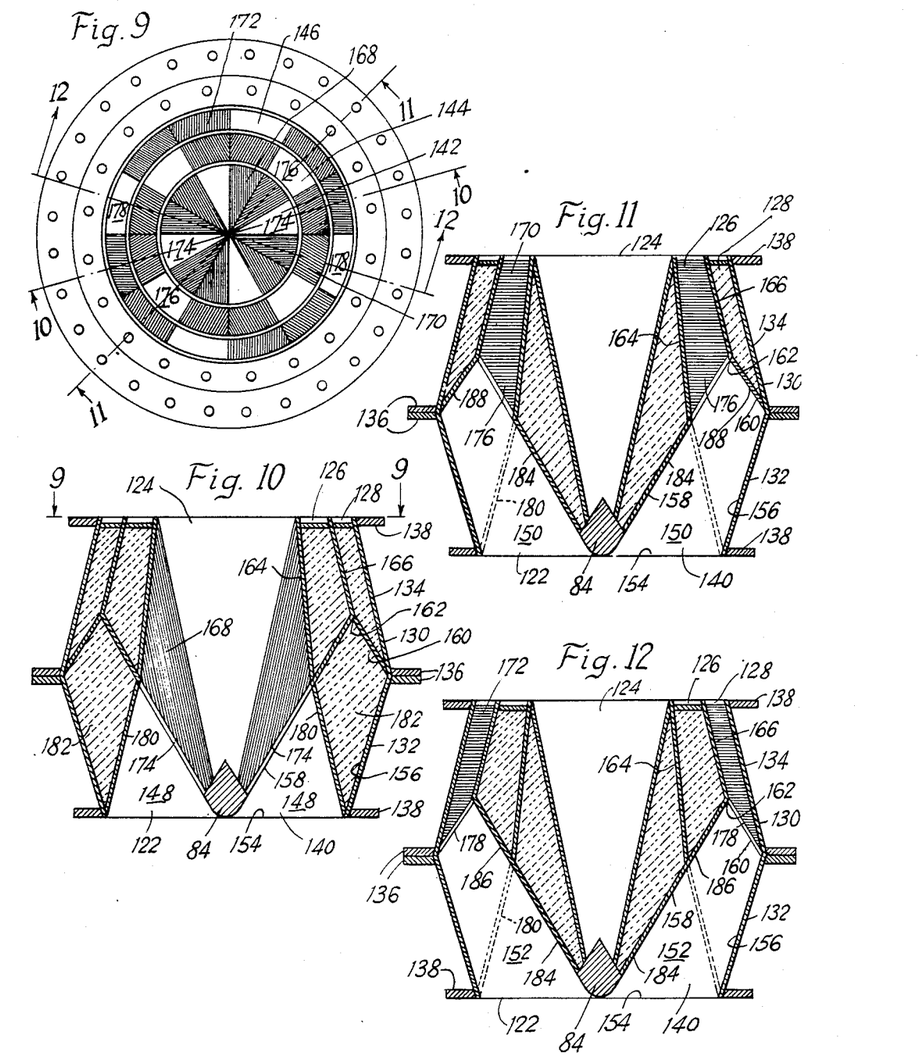
Fig. 9 is an end projection of an additional modification.
Figs. 10, 11, and 12 are sectional elevations along lines 10—10, 11—11, and 12—12 respectively, of Fig. 9.

The closure members or crickets 168, 170, 172 are of the general form and cross-section as for Figs. 3-7, to serve not only as closures but as means for preventing accumulation of fuel within the device, and for improving flow conditions. Each cricket spans a selected portion of two adjacent sectoral divisions or channels, leaving the corresponding portion of every third channel open to provide ports 174, 176 and 178 respectively for discharge of fuel toward the corresponding outlets. This results in a circumferential arrangement of crickets as seen in Fig. 9, wherein the crickets 168 overlie the inner portions of the groups of channels 150 and 152, leaving the inner portions of channels 148 open for passage of fuel through ports 174. Similarly, crickets 170 block off intermediate portions of channels 148 and 152 leaving the intermediate portions of channels 150 open for passage of fuel through ports 176; and crickets 172 block off outer portions of channels 148 and 150, leaving the outer portions of channels 152 open for passage of fuel through ports 178. Plates 180 may be provided to extend circumferentially across channels 148 of one group, opposite ports 174, and longitudinally from the periphery of the inlet opening 122 to the upper edges of ports 174, thus sealing off a portion of each channel 148 to provide a space 182 which lies beneath half-width portions of crickets 170 and 172, the space so provided being preferably filled with heat-refractory material to prevent infiltration of fuel.

Bottom plates 184, 186 and 188 may be provided for crickets 168, 170 and 172 respectively as in the previously described embodiments, and the interiors of the crickets similarly filled with a heat-refractory cement, as indicated.

The flow areas provided throughout individual passages of the various groups, from inlet 122 to their respective outlets, are preferably maintained constant as in Figs. 3-7.

Figs. 13-20 illustrate a further modification whereby a stream of fuel entering a single circular inlet opening 122 is divided and distributed for discharge through three concentrically arranged circular outlet openings 124, 126, 128 as in Figs. 9-12. A similar form of outer casing 130 is employed having conical sections 132 and 134 preferably connected as by bolting flanges 136, as previously shown, for removal of at least one section 132 for inspection purposes. Other flanges 138 may be provided at opposite ends for making connections with the fuel supply pipe 38 and a suitable branch outlet fitting 42. Plates 190 arranged radially and having edges 192 in or adjacent the plane of the casing inlet 122 divide the circular area of the inlet into a plurality of sectoral divisions 194, and are extended, or have other plates connected thereto as extensions, to define groups of passages 196, 198, and 200 connecting groups of sectoral inlet divisions 202, 204, and 206 with outlet openings 124, 126 and 128. The plates 190 may be secured to a round bar 208, from their edges 192 adjacent the inlet opening 122 to about the location of plane 18—18 (Fig. 13), to hold the plates in assembled relation; thin spacer bars (not shown) extending between adjacent plates and being welded thereto, if desired, for a similar purpose. Plates 210 and 212, as extended, form the walls of passages 196 and terminate in a complete circle at the periphery of the central outlet 124 where they may be secured to a circular collar 214; each plate 210 separating a passage 196 from an adjacent passage 200, and each plate 212 separating a passage 196 from an adjacent passage 198. Plates 212 and 216, as extended, form the major portions of the walls of passages 198; plates 212 terminating at the periphery of outlet 124 as already described, and plates 216, including a circumferentially extended portion 220, terminating in a complete circle at the outer periphery of outlet 126 where they may be secured to a circular collar 218; the extension 220 having an edge portion 222 joined to a portion 224 of plate 210, and having another edge portion 226 joined to a portion 228 of the next succeeding plate 216. Each plate 216 is joined to a side of the adjacent plate 210 along a broken line partially indicated by line 230 connecting points 232 and 234 in planes 16—16 and 17—17. Each plate 212 and the plate 210 beyond the adjacent plate 216 intersect to form a peak or ridge 236 intersecting the central axis at plane 18—18, the ridge being steeply inclined in relation to the plane of the inlet opening 122.

Figure 13:
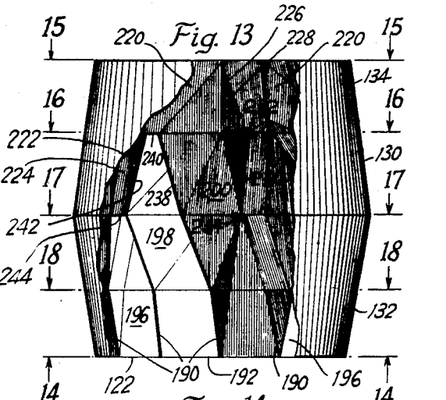
Fig. 13 is an elevational view, partly broken away, showing a further modification.
Figure 14:
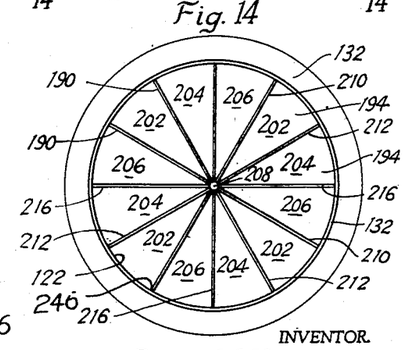
Fig. 14 is an end projection in the plane of line 14—14 of Fig. 13.
Figure 15:
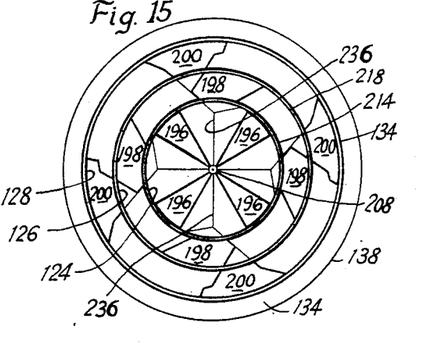
Fig. 15 is an end projection in the plane of line 15—15 of Fig. 13.
Figure 16:
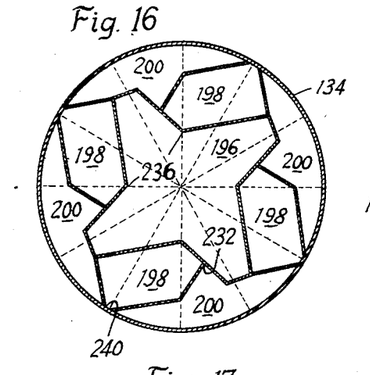
Figs. 16, 17, and 18 are transverse sections along lines 16—16, 17—17, and 18—18, respectively, of Fig. 13.

The passages 200 originating in four sectoral divisions 206 of the inlet 122 between adjacent plates 210 and 216, extend to the full circumference of the outer annular outlet 128 between the casing 130 and the exterior surfaces of the plate assembly described above. None of the plates contact the casing section 134 in the zone between planes 15—15 and 16—16 so that passages 200 may be suitably flared to embrace the full circumference of the annulus 128.

Figure 17:
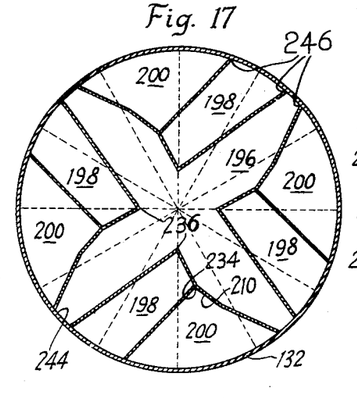
Figure 18:
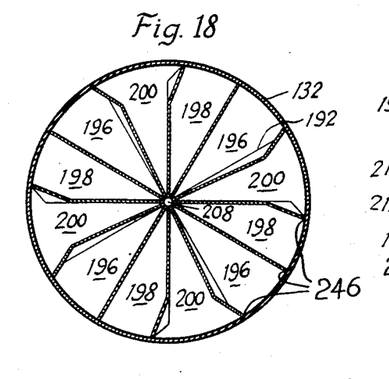
Figure 19:
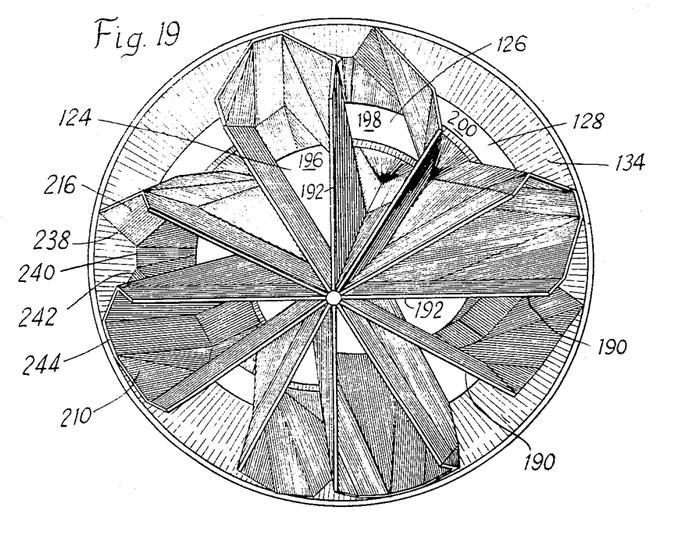
Fig. 19 is a pictorial view from the inlet end, corresponding to Fig. 14 but with the longitudinal axis inclined; with a portion of the casing removed.
Figure 20:
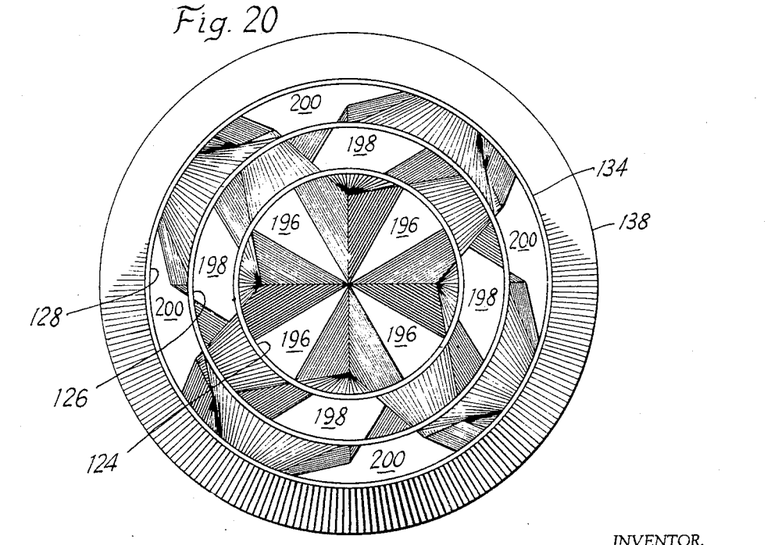
Fig. 20 is a pictorial view from the outlet end, corresponding to Fig. 15.

In the zone between planes 16—16 and 17—17, plates 216 as extended are in contact with the casing section 134 at edges 238, 240 and 242, and plates 210 at edges 244, where such plates may be suitably secured to the section if desired.

The casing section 132 is preferably made removable for inspection purposes as mentioned above, and consequently is free of the plate assembly. It will be noted, however, that all plates 190 are formed to provide outer edges 246 in contact with the casing section 132, as indicated particularly in Figs. 14, 17 and 18.

In this description, the various plates together with their extensions have been considered as being continuous from inlet to the point where connection is made either with the corresponding outlet or with some other plate of the assembly. It is to be understood however that for purposes of manufacture and assembly, it might be desirable to form such plates in sections, in which case the plates may be divided along suitable lines, for example, along lines where the plates are bent to provide changes in direction, as indicated by the lighter lines in Fig. 13 and by certain lines in Figs. 19 and 20. Such angular bends may of course be replaced by curved plate portions, if desired.

In this arrangement of plates and plate extensions, the flow areas throughout the various passages have been maintained substantially constant from inlet to outlet, for equal velocities and equal distribution as to quantity and quality of the discharged fuel, as in other forms of the invention; also in forming the plates, all surfaces have been arranged to lie either at right angles to a plane normal to the central axis of the distributor or at a relatively steep inclination to such a plane, greater than the angle of repose for the solids being transported, the minimum desirable angle of inclination being about 45°. An additional feature of the arrangement is that the entire space within the casing 130 is effective as flow area for the various passages, without inactive spaces or pockets, the only decrease in the available flow area being due to the material of the plates 190 which divide one passage from another.

Figures 21, 22, 23:
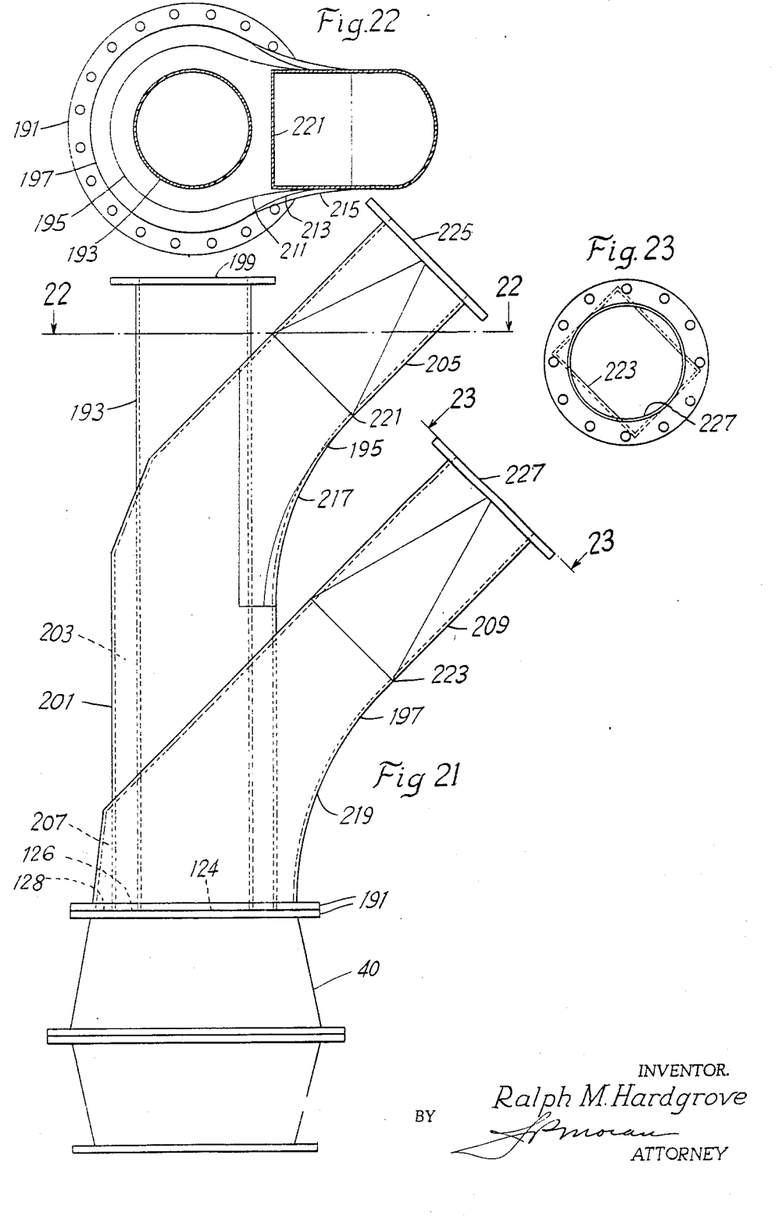
Fig. 21 is an elevational view showing a part included in Figs. 1 and 2.
Fig. 22 is a plan section along line 22—22 of Fig. 21.
Fig. 23 is a partial end projection in the plane of line 23—23 of Fig. 21.

Figs. 21, 22 and 23 show a form of branched outlet fitting 42, as in Figs. 1 and 2, suitable for use with either of the three-way distributors described, a removable connection preferably being made with distributor 40 as detailed in Figs. 13—20, for example, as by companionate bolting flanges 191. The branches 193, 195 and 197 are arranged concentrically at their inlet ends to register with the corresponding concentric outlet openings of the distributor. Branch 193 terminating in a circular outlet 199 is cylindrically formed throughout of the same internal diameter as the central outlet opening 124 for constant velocity. Branch 195 is cylindrically formed throughout an inlet portion 201 to provide an annular flow space 203 about the branch 193, and its shape gradually modified as shown to join the outlet portion 205, which extends at an angle of about 45° to the axis of branch 193. Branch 197 is similarly arranged relative to the branch 195 to provide an annular space 207 and its shape gradually modified as shown to join the outlet portion 209, also at 45° to the axis of branch 193. The modification in contour in each case includes a gradual change from the annular formation about the vertical axis, in relatively wide sweeping curves as at 211, 213, 215, 217, and 219, to a rectangular formation about the inclined axis at locations 221 and 223 for branches 195 and 197 respectively; and then by a further gradual change from the rectangular cross-sections to the circular outlets 225, 227 of equal areas. In addition to providing gradual changes in the contour and cross-section of the inclined branches 195 and 197 throughout their lengths, it is arranged to maintain substantially constant flow areas throughout, and with equal entrance areas for all branches, as described, the outlets 199, 225 and 227 are also made equal. Such an arrangement has the advantage of minimizing pressure losses, and provides a continuation of substantially the same flow condition for each of the divisional streams as exists throughout the distributor.

It is to be noted that in the several embodiments described, each of the separate concentric outlet openings or passages is formed from the junction of a plurality or group of passages originating in sectoral divisions of the inlet opening or passage, and where four such divisions are formed to provide entrances to individual passages of the group, such divisions are symmetrically arranged at circumferential spacings of 90° about the central axis.

Tests have shown that whereas the concentration of suspended solid material in an individual sectoral division of the inlet stream may vary as much as 87% from the average concentration for the entire cross-section of the stream, that by arranging and grouping the spaced passages as disclosed, the average concentration of suspended solid material in each of the plurality of outlet conduits may be brought to within 2%, and at times considerably less than 2%, of the average concentration of the inlet stream.

While in accordance with the provisions of the statutes I have illustrated and described herein the best forms of my invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. In a distributor for gas-borne solid particles, a casing of circular cross-section throughout having an inlet at one end and an odd number of concentrically arranged outlets at its opposite end, relatively thin plates for dividing said inlet area into a plurality of sectoral divisions and having extensions in the direction of said outlet end, said plates and said extensions defining flow passages connecting a group of said divisions with one of said outlets and other groups with the remaining outlets, each of said passages terminating in a discharge opening coinciding with the entire area of the outlet with which it connects.

2. In a distributor for gas-borne solid particles, a casing of circular cross-section throughout having an inlet at one end and concentrically arranged outlets at its opposite end, relatively thin plates for dividing said inlet area into a plurality of sectoral divisions and having extensions in the direction of said outlet end, said plates and said extensions defining flow passages connecting separate groups of said divisions each with a separate one of said outlets, said passages utilizing substantially the entire space within said casing as effective flow area except for the space occupied by the material of said plates.

3. In a device for distributing gas-borne finely-divided material from a main conduit into a plurality of branch conduits, a casing of circular horizontal cross-section throughout providing a circular inlet area at its lower end and a plurality of concentric outlet areas at its upper end, radially extending plate members for dividing the circular inlet area into divisional inlet areas of sectoral formation, and means including said plate members forming upwardly extending passages continuous from said inlet area to said outlet areas and connecting separate groups of said sectoral inlet divisions each to a separate one of said outlet areas, each said group comprising an even number of uniformly spaced sectoral divisions, said passages terminating at said outlet areas in unitary concentric discharge openings having a combined area substantially equal to the sum of said outlet areas, the walls of said passages throughout said passages and facing said outlet areas having surfaces arranged at angles to the horizontal greater than the angle of repose of said material, said walls being mutually formed and arranged to prevent material becoming pocketed within said casing when the normal velocity of upward flow of material therethrough is reduced.

4. In a distributor for gas-borne finely-divided material, a casing of circular cross-section throughout having an inlet for said material at one end and concentrically arranged outlets for said material at its opposite end, relatively thin plates for dividing the area of said inlet into a plurality of substantially equal sectoral divisions in an even multiple of the number of said outlets, said plates having extensions in the direction of the outlet end and defining flow passages connecting a group of diametrically opposite divisions with each of said outlets, said plates and said extensions forming passages continuous from said sectoral inlet divisions to said concentrically arranged outlets and terminating at said outlets in concentric discharge openings having a combined area substantially equal to the sum of the areas of said outlets, the walls of said passages being mutually formed and arranged to prevent material becoming pocketed within said distributor when said distributor is arranged for upward flow of material therethrough.

5. In a distributor for gas-borne finely-divided material, a casing of circular cross-section throughout having an inlet for said material at one end and a minimum of three concentrically arranged outlets for said material at its opposite end, relatively thin plates for dividing the area of said inlet into a plurality of substantially equal sectoral divisions in an even multiple of the number of said outlets, said plates having extensions defining flow passages of substantially equal flow area throughout connecting a group of diametrically opposite divisions with each of said outlets.

6. In a system for distributing pulverized material to a plurality of points of use, a distributing device comprising a casing of circular cross-section having an inlet opening for said material at one end and concentrically arranged outlet openings for said material at its opposite end, means for dividing the area of said inlet opening into sectoral areas numbering four times the number of said outlet openings, means forming passages of substantially equal flow area throughout for connecting a group of said sectoral inlet areas with one of said outlet openings and another group of said areas with another of said outlet openings, said passages terminating in concentric discharge openings each coinciding with the entire area of the outlet opening with which it connects, and a branch outlet fitting having concentrically arranged inlet openings registering with said correspondingly arranged distributor outlet openings, said fitting having separate outlet branches each having a passage formed therein of substantially the same flow area throughout as the area of the registering distributor outlet opening.

7. In a conduit system for transporting gas-borne pulverulent material, a conduit fitting for connecting a circular inlet conduit with a plurality of circular branch outlet conduits, said fitting having a circular inlet at one end and concentric circular outlet openings at the opposite end, a series of radially arranged partitions for dividing the area of said inlet opening into sectoral divisions, means forming a group of passages connecting alternate inlet divisions with one of said outlet openings, and means forming a group of other passages connecting other alternately arranged inlet divisions with another of said outlet openings, each of said means including crickets formed between successive passages of each of said groups, said crickets having wall portions converging in the direction of flow through said passages.

8. In a distributor for gas-borne solid particles, a casing of circular cross section throughout providing an inlet area at one end and an outlet area at its opposite end, radially disposed plates for dividing said inlet area into a plurality of sectoral divisions to form a circular series of inlet passages interiorly of said casing, said plates having extensions in the direction of said outlet end to form a lesser number of continuation passages connecting selected passages of said series with different portions of said outlet area, said continuation passages terminating at said outlet area in concentric discharge openings having a combined area substantially equal to said outlet area.

9. In a distributor for gas-borne solid particles, a casing of circular cross section throughout providing an inlet area at one end and an outlet area at its opposite end, radially disposed plates for dividing said inlet area into a plurality of sectoral divisions to form a circular series of inlet passages interiorly of said casing, said plates having extensions in the direction of said outlet end to form a lesser number of continuation passages connecting selected passages of said series with different portions of said outlet area, said continuation passages terminating at said outlet area in concentric discharge openings having a combined area substantially equal to said outlet area, said plates and said extensions being so formed and arranged as to cause all passage wall surfaces facing said outlet end to be disposed at an angle to the horizontal greater than the angle of repose of said solid particles when the direction of flow through said distributor is upward.

10. In a distributor for gas-borne solid particles, a conduit member of symmetrical cross section throughout about its longitudinal axis providing an inlet area at one end and a plurality of concentrically arranged outlet areas at its opposite end, and plates arranged radially with respect to said axis for dividing said inlet area into a plurality of inlet divisions, said inlet divisions being arranged in groups wherein individual inlet divisions of the respective groups are interspersed circumferentially, said plates having extensions in the direction of said outlet areas, said plates and said extensions defining passages connecting separate groups of said inlet divisions each to a separate one of said outlet areas, said passages terminating at said outlet areas in substantially unitary concentric discharge openings having a combined area substantially equal to the sum of said outlet areas.

11. In a distributor for gas-borne solid particles, a conduit member of symmetrical formation throughout about its longitudinal axis providing an inlet at one end and an outlet at its opposite end, plates of polygonal formation arranged radially with respect to said axis for partitioning said inlet into a plurality of separate inlet divisions and for defining a series of inlet channels extending longitudinally therefrom toward said outlet, said plates terminating in the direction of said outlet in edges inclined to said axis to form a series of plate corners angularly distributed about said axis and radially spaced from the surrounding wall surface of said conduit member, means forming a wall continuous about said axis and extending from said series of plate corners to said outlet for dividing said outlet into a plurality of unitary concentrically arranged outlet areas, and means for partially closing off the outlet ends of selected groups of said channels to form a series of angularly distributed outlet ports at each side of said wall providing communication at one side between one selected group of said channels and one of said outlet areas and at the opposite side between another selected group of said channels and another of said outlet areas.

12. In a distributor for gas-borne solid particles, a conduit member of circular cross section throughout about its longitudinal axis providing a circular inlet at one end and a circular outlet at its opposite end, the cross section of said conduit member being gradually increased from each of said ends to a maximum cross section at an intermediate location, radially arranged plates for partitioning said inlet into a plurality of separate inlet divisions and for defining a series of inlet channels extending longitudinally therefrom toward said outlet, said plates being of polygonal formation and terminating in the direction of said outlet in edges inclined to said axis to form a series of circumferentially distributed plate corners radially spaced from the surrounding wall surface of said conduit mem- from said series of plate corners to said outlet ber, means forming an annular wall converging from said series of plate corners to said outlet for dividing said outlet into a plurality of unitary concentrically arranged outlet areas, and means for partially closing off the outlet ends of selected groups of said channels to form a series of circumferentially distributed ports at each side of said wall providing communication at one side between one selected group of said channels and one of said outlet areas and at the opposite side between another selected group of said channels and another of said outlet areas, said last named means comprising wall surfaces converging toward the respective outlet areas and forming peaks between successive ports of each of said series.

13. In a distributor for gas-borne solid particles, a conduit member of similar cross section throughout about its longitudinal axis providing an inlet area at one end and a plurality of concentrically arranged outlet areas at its opposite end, and plates arranged radially with respect to said axis for dividing said inlet area into a plurality of inlet divisions and having extensions in the direction of said outlet areas, said inlet divisions being arranged in groups wherein individual inlet divisions of the respective groups are interspersed circumferentially, said plates and said extensions forming partitions defining flow passages connecting separate groups of said inlet divisions each to a separate one of said outlet areas, said passages utilizing substantially the entire space within said conduit member as effective flow area except for the space occupied by said partitions.

RALPH M. HARDGROVE.

CERTIFICATE OF CORRECTION.

Patent No. 2,364,633.                                             December 12, 1944.

RALPH M. HARDGROVE.

It is hereby certified that error appears in the printed specification of the above numbered patent requiring correction as follows: Page 6, second column, line 24, claim 12, strike out the words "from said series of plate corners to said outlet"; and that the said Letters Patent should be read with this correction therein that the same may conform to the record of the case in the Patent Office.

Signed and sealed this 10th day of April, A. D. 1945.

Leslie Frazer (Seal)                                      Acting Commissioner of Patents.